United States Patent
Afzal et al.

(10) Patent No.: US 10,873,499 B2
(45) Date of Patent: Dec. 22, 2020

(54) NETWORK-CHARGING COMMUNICATION-FAILURE HANDLING

(71) Applicant: T-Mobile USA, Inc., Bellevue, WA (US)

(72) Inventors: Muhammad Waqar Afzal, Bellevue, WA (US); Karunakalage Viraj Rakitha Silva, Renton, WA (US); Suresh Thanneeru, Redmond, WA (US); Rahul Pal, Bellevue, WA (US); Nader Nabil Farouk Riad, Bothell, WA (US); Suliman Albasheir, Issaquah, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/414,113

(22) Filed: May 16, 2019

(65) Prior Publication Data
US 2020/0177439 A1  Jun. 4, 2020

Related U.S. Application Data

(60) Provisional application No. 62/775,268, filed on Dec. 4, 2018.

(51) Int. Cl.
*H04L 12/24* (2006.01)
*H04L 12/14* (2006.01)

(52) U.S. Cl.
CPC ...... *H04L 41/0668* (2013.01); *H04L 12/1403* (2013.01); *H04L 41/069* (2013.01)

(58) Field of Classification Search
CPC ................. H04L 41/0668; H04L 12/1403; H04L 41/069
See application file for complete search history.

(56) References Cited

U.S. PATENT DOCUMENTS 10,425,539 B2 * 9/2019 Xu .................. H04M 15/66
2005/0078660 A1 * 4/2005 Wood ............... H04M 15/43
370/352

(Continued)

FOREIGN PATENT DOCUMENTS

KR    20010004867 A    1/2001
WO    WO2014008050 A1  1/2014

OTHER PUBLICATIONS

ETSI TS 123 502 v15.3.0, "5G; Procedures for the 5G System", Sep. 2018, pp. 111-113.

(Continued)

*Primary Examiner* — Mohammad S Anwar
(74) *Attorney, Agent, or Firm* — Lee & Hayes, P.C.

(57) ABSTRACT

A telecommunication system can include a network flow controller (e.g., SMF) and a network-charging node (e.g., CHF). The flow controller can generate a first charging-event record associated with a network session. The flow controller can detect an outage at least partly by determining that no network-charging node is available to receive the first charging-event record and, in response, mark the first charging-event record to provide a first marked charging-event record. The flow controller can store the first marked charging-event record in a buffer. After the marking, the flow controller can determine that a network-charging node is available to receive the first marked charging-event record, and, in response, send the first marked charging-event record to the network-charging node. The network-charging node can determine a charging-data record indicating occurrence of an event during the outage.

18 Claims, 9 Drawing Sheets

(56) References Cited

U.S. PATENT DOCUMENTS

2010/0257077 A1* 10/2010 Cai .................. H04M 15/00
705/34
2015/0081903 A1 3/2015 Molinero Fernandez et al.

OTHER PUBLICATIONS

ETSI TS 129 244 v15.3.0, "LTE; Interface Between the Control Plane and the User Plane Nodes", Oct. 2018, pp. 48-62.
ETSI TS 129 513 v15.1.0, "5G; 5G System; Policy and Charging Control Signalling Flows and QoS Parameter Mapping; Stage 3", Oct. 2018, pp. 1-11 and 63-70.
ETSI TS 132 240 V153.0, "Digital Cellular Telecommunications System (Phase 2+) (GSM), Charging Architecture and Principles", Oct. 2018, pp. 23-29, 32-34, 37-42.
ETSI TS 132 255 V15.0.0, "5G; Telecommunication Management; Charging Management", Oct. 2018, pp. 9-57 and 60-73.
ETSI TS 132 290 V15.1.0, "5G; Telecommunication Management; Charging Management; 5G System", Oct. 2018, pp. 3-23.
ETSI TS 132 291 V15.0.0, "5G; Telecommunication Management; Chargine Management; 5G System, Charging Service; Stage 3", Oct. 2018, pp. 8-14 and 22-26.
ETSI TS 132 297 V15.1.0, "Digital Cellular Telecommunications System (Phase 2+) (GSM); Universal Mobile Telecommunications System (UMTS); LTE", Oct. 2018, pp. 11-26.
ETSI TS 138 331 V15.2.1, "5G; NR; Radio Resource control (RRC); Protocol Specification", Jun. 2018, pp. 18-19 and 30-33.
Tovinger, T. "Management, Orchestration, and Charging", 3GPP, Mar. 22, 2018, retrieved Jan. 22, 2019, from <<http://www.3gpp.org/NEWS-EVENTS/3GPP-NEWS/1951-SA5_5G>>, 7 pages.
ETSI TS 132 295 V15.0.0, "Digital cellular telecommunications system (Phase 2+) (GSM); Universal Mobile Telecommunications System (UMTS);", Jun. 2018, 40 pages.
The PCT Search Report and Written Opinion dated Mar. 9, 2020 for PCT Application No. PCT/US2019/062384, 9 pages.

* cited by examiner

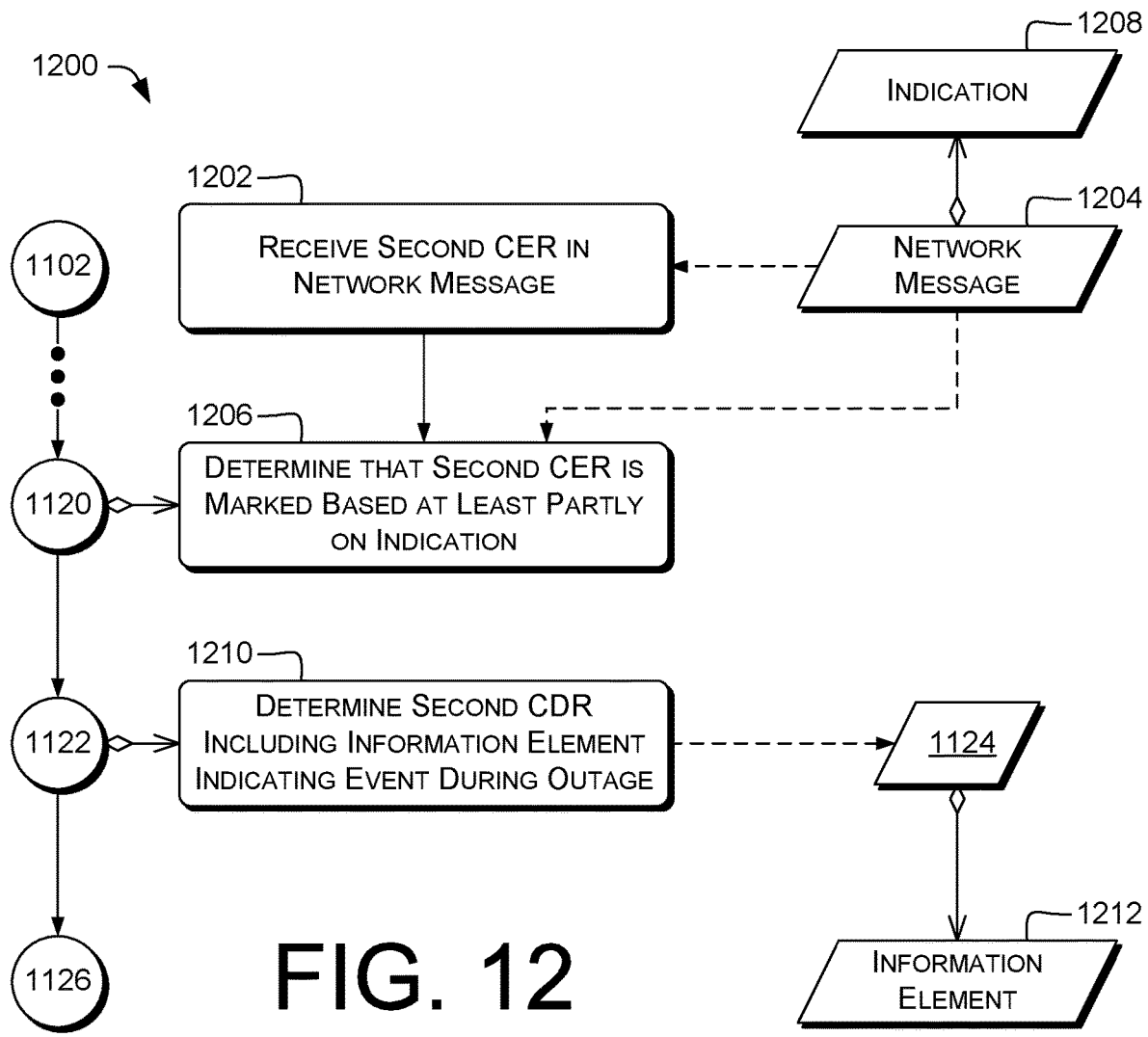

NETWORK-CHARGING COMMUNICATION-FAILURE HANDLING

CROSS-REFERENCE TO RELATED APPLICATION

This application is a nonprovisional application of, and claims priority to and the benefit of, U.S. Patent Application Ser. No. 62/775,268, filed Dec. 4, 2018, entitled "Systems, Methods, and Devices for Fail-Open Handling Between SMF and CHF," the entirety of which is incorporated herein by reference.

BACKGROUND

Modern telecommunications networks such as cellular telephone networks can support a variety of types of session, such as voice, video, or messaging. Second-generation (2G) and third-generation (3G) cellular networks such as Global System for Mobile Communications (GSM) networks or Universal Mobile Telecommunications System (UMTS) networks generally carry streaming media over circuit-switched (CS) connections. Fourth-generation (4G) cellular networks, such as Long Term Evolution (LTE) (including LTE-Advanced) networks, and fifth-generation (5G) cellular networks, generally carry streaming media over packet-switched (PS) connections. Those PS connections may also carry non-streaming types of data, e.g., file downloads. Many cellular networks are standardized by the Third-Generation Partnership Project (3GPP).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be, in at least one example, included in the first component or operation.

FIG. 12 illustrates example processes for managing charging records, and interactions between a network-charging node and other network nodes.

DETAILED DESCRIPTION

Overview

Figure 1:
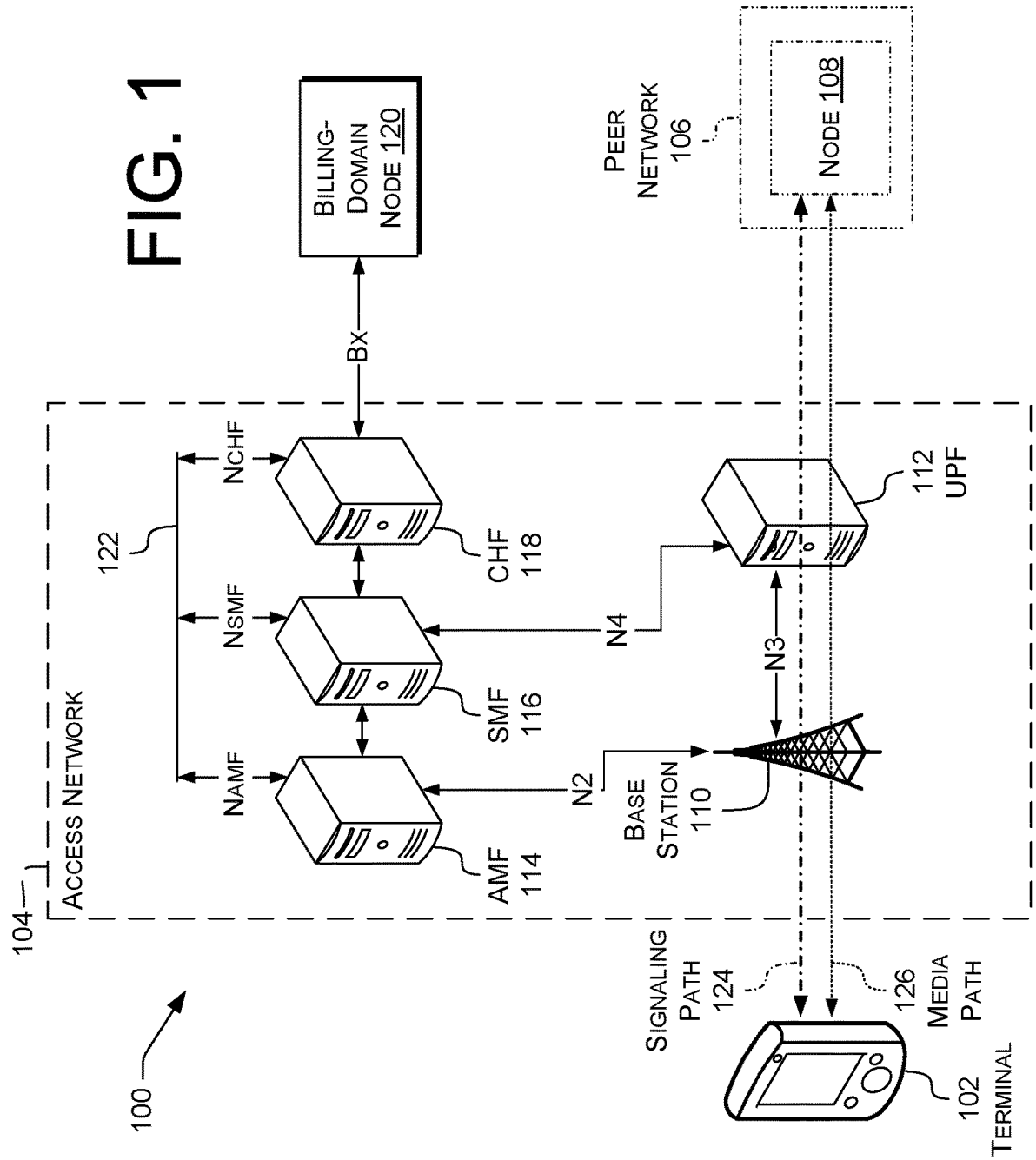
FIG. 1 illustrates an overview of nodes and devices involved in charging management for a terminal.

In 5G (3GPP Rel 15), the Session Management Function (SMF) sends data of service usage to the Charging Function (CHF). The CHF then prepares Charging Data Records (CDRs) for use by the billing system. However, if the SMF is not able to communicate with any CHF, service-usage data may be lost. In some examples, the SMF buffers the service-usage data during an outage of communications with a CHF. When the outage ends, the SMF sends the buffered service-usage data, along with a flag indicating the data was captured during an outage. The CHF then includes the flag in the corresponding CDRs. This permits customers to continue using network services, even when the SMF and CHF cannot communicate. For example, in some markets, each SMF may only be served by one CHF. Various examples prevent an SMF-CHF outage from rendering the network unusable by customers.

In some examples, such as 3GPP 5G, the SMF and CHF communicate via an HTTP/2 REST interface. For example, after an outage, the SMF can send the stored charging events to the CHF using the HTTP/2 REST interface. The SMF can include a tag or element in the HTTP/2 header sent with the stored charging events indicating that these are buffered events. For brevity herein, "HTTP" refers to any version of HTTP, SPDY, or HTTP-over-QUIC, including any of those additionally employing SSL or Transport Layer Security (TLS) (e.g., https), unless a specific version or protocol is indicated.

This disclosure describes, in part, a telecommunications network configured to carry network traffic via appropriately-configured flow(s). A flow is an identified logical connection for conveying data in a manner determined by the flow. For example, a flow can have particular QoS or throughput (e.g., bits per second, bps) characteristics. A terminal can have one or more flows open concurrently via a single radio connection. Flows can include one or more bearer(s), tunnel(s), or other network link(s). Examples of bearers can include, in 3GPP 5G New Radio (NR), signaling radio bearers (SRBs) or (user-plane) data radio bearers (DRBs) between the terminal and a gNodeB (3GPP 38.331 v15.2.1 § 4.4, § 5.3.5.6.4, and § 5.3.5.6.5). Bearers can be selected based on packet loss, delay budget, or other QoS criteria. Tunnels can include, e.g., an N3 tunnel between a radio access network (RAN) and a User Plane Function (UPF), an IPsec tunnel, a Proxy Mobile IP (PMIP) or PMIPv6 tunnel, or another network tunnel.

Charging management according to some examples herein can include any of: creation of flows, termination of flows, assignment of flows to terminals or traffic flows, assignment of QoS parameters of flows, or selection of flows to carry particular types of traffic. Flow assignment or selection can be performed, e.g., when flows are created or terminated, or at handover or other changes of state of a terminal.

As used herein, a "terminal" is a communication device, e.g., a cellular telephone or other user equipment (UE) configured to perform, or intercommunicate with systems configured to perform, techniques described herein. Terminals can include, e.g., wireless or wired voice- or data-communication devices. A terminal can be a device that includes a user interface (e.g., as does a smartphone), or can be a device that does not include a user interface. For example, a streaming server configured to provide audio or visual content on demand can be a terminal. Such a terminal may not include a user interface, and may instead respond to other terminals that form queries and send those queries to the server in response to actions taken via interfaces at those other terminals. A terminal can be, e.g., a cellular phone, smartphone, tablet computer, personal digital assistant (PDA), personal computer (PC), laptop computer, media center, work station, etc.

The terms "session" and "communication session" as used herein include a communications path for bidirectional exchange of data among two or more terminals. Example sessions include voice and video calls, e.g., by which human beings converse; data communication sessions, e.g., between two electronic systems or between an electronic system and a user-interface device in use by a human being; or a Rich Communication Suite (RCS) session. In some examples, a "PDU session" carries traffic for a particular packet data network (PDN), e.g., the Internet or an IP Multimedia Subsystem (IMS), and that traffic includes multiple flows or communication sessions, e.g., one for email and another for streaming video.

As used herein, "structured text" describes data-serialization formats that: express data in a human-readable character set (e.g., ASCII, ISO 8859-1, or any encoding of Unicode); permit including at least two logically separate data values in a single serialized data object; and permit including metadata within the serialized data object distinguishing the at least two logically separate data values from each other. Examples of structured text include, but are not limited to, JavaScript Object Notation (JSON), Extensible Markup Language (XML), Abstract Syntax Notation 1 (ASN.1) encoded with the Generic String Encoding Rules (GSER), ASN.1 encoded with the JSON Encoding Rules (JER), ASN.1 encoded with the XML Encoding Rules (XER) (or variants such as Canonical XER or Extended XER), YAML ("YAML Ain't Markup Language"), Initialization (INI) files (or variants or extensions such as TOML, "Tom's Obvious, Minimal Language"), or comma-separated value (CSV) (or variants using other separators, such as tab-separated, TSV). XER-encoded ASN.1 is also XML, and JER-encoded ASN.1 is also JSON.

Subsection headers in this Detailed Description are solely for convenience in reading. No limitations are implied by the presence or arrangement of the subsection headers, or by the separation of features between those subsections. Some examples include features from only one subsection. Some examples include features from more than one subsection.

This "Overview" section is intended only to provide a brief overview of subject matter disclosed herein according to one or more illustrative embodiments, and does not serve as a guide to interpreting the claims or to define or limit scope. This section is provided to introduce illustrative features in a simplified form; these features are further described below. This section is not intended to identify key features or essential features of the claimed subject matter, nor is it intended to be used as an aid in determining the scope of the claimed subject matter. The claimed subject matter is not limited to implementations that solve any or all disadvantages noted above. The claimed subject matter is not limited to implementations that provide at least one of the results listed herein.

Illustrative Telecommunications Networks and Components

FIG. 1 illustrates an example telecommunication system 100. Terminal 102, e.g., user equipment, communicates with access network 104 of the telecommunication system 100. Terminal 102 can communicate with peer telecommunications network 106 (shown in phantom), e.g., with a node 108 thereof, such as a server or terminal. Although peer network 106 and its components are shown in phantom, in some examples not depicted, at least one component of peer network 106 can be part of telecommunication system 100.

Access network 104 is shown as an NR access network. However, access network 104 can represent any type of access network including components performing functions described herein, e.g., an LTE access network or a non-3GPP access network such as a WIFI network. In some examples, voice calls can be carried over access network 104 using VoNR or other Vo5G (voice over 5G) configurations, such as voice over LTE (VoLTE) in non-standalone (NSA) NR deployments; or using VoLTE on an LTE access network.

In the illustrated example, access network 104 includes a base station 110, e.g., an NR gNodeB, an LTE eNodeB, a WIFI wireless access point (WAP), or another access point, that provides connectivity to access network 104. Access network 104 also includes an NR UPF 112, which can be an example of a packet gateway. UPF 112 can convey traffic via flows or sessions between terminal 102 and networks outside access network 104, e.g., peer network 106.

Access network 104 also includes an AMF 114 and SMF 116. AMF 114 can represent an access controller or other device responsible for interfacing between a flow controller such as SMF 116 and a RAN. SMF 116 can be an example of a flow controller that provisions flows, e.g., in UPF 112, to carry network traffic of sessions.

Access network 104 can also include a CHF 118, e.g., a server or other network device responsible for aggregating information about usage of resources of access network 104, and for communicating that information to a billing-domain network node. Access network 104 can include more than one of any of these components, or can include other components not shown.

In the illustrated example, access network 104 is communicatively connected with a billing-domain node 120. Billing-domain node 120 can perform functions described in 3GPP or other pertinent specifications. For example, billing-domain node 120 can receive CDRs from CHF 118 and determine billing statements.

In the illustrated example, AMF 114, SMF 116, and CHF 118 provide service-based interfaces Namf, Nsmf, and Nchf, respectively, that can be used over a network link 122. Service-based interfaces can be provided or consumed via HTTP or other protocols, and can exchange data encapsulated in structured text or other forms. Examples include JSON-over-HTTP services and W3C Web Services. Although network link 122 is shown in a bus topology, other topologies can be used. For example, network link 122 can be implemented using multiple point-to-point links.

In the illustrated example, AMF 114 communicates with base station 110 via an N2 interface; base station 110 with UPF 112 via an N3 interface; and UPF 112 with SMF 116 via an N4 interface. SMF 116 can control sessions by sending commands to UPF 112 via N4, and can report charging information of those sessions by sending Nchf requests to CHF 118 via network link 122. CHF 118 can then generate CDRs and send the CDRs to billing-domain node 120 via an appropriate Bx interface.

In the illustrated example, a signaling path 124 of a communication session passes through base station 110 and UPF (routing device) 112 in access network 104. Signaling path 124 can represent a dedicated signaling link (e.g., a Signaling System 7, SS7, link) or a flow of signaling data across a link shared with non-signaling traffic (e.g., ISUP over SIGTRAN, or non-ITU TCP/IP-family protocols such as SIP). Signaling path 124 may pass through components of an IMS or other network nodes, omitted for brevity.

A media path 126 of a communication session passes through base station 110 and UPF 112 in access network 104. UPF 112 forwards the traffic to or from peer network 106. Media path 126 may pass through other network nodes, omitted for brevity, e.g., routers or firewalls.

The devices and networks of FIG. 1 may cooperate to accomplish the initiation of a communication session of terminal 102, e.g., using SIP or other 3GPP or IETF protocols. Techniques described herein with respect to originating communication sessions can also be used for receiving (terminating) sessions or for exchanging messages sent during an established phase of a communication session, in some examples.

Example cellular access networks 104 can include a GSM or UMTS network; a universal terrestrial radio network (UTRAN) or an GSM Enhanced Data rates for GSM Evolution (EDGE) radio access network (GERAN); an E-UTRAN (e.g., LTE); an Evolution-Data Optimized (EVDO), Advanced LTE (LTE+), Generic Access Network (GAN), Unlicensed Mobile Access (UMA), GPRS, EDGE, High Speed Packet Access (HSPA), or evolved HSPA (HSPA+) network.

Example non-cellular access networks 104 can include a WIFI (IEEE No802.11), BLUETOOTH (IEEE No802.15.1), or other local-area network (LAN) or personal-area network (PAN) access networks, e.g., in the IEEE No802.1* family, a satellite or terrestrial wide-area access network such as a wireless microwave access (WIMAX) network, a wired network such as the PSTN, an optical network such as a Synchronous Optical NETwork (SONET), or other fixed wireless or non-wireless networks such as Asynchronous Transfer Mode (ATM) or Ethernet, e.g., configured to transport IP packets, e.g., IPv4, IPv6, or any other evolution of an IP-based technology. A cellular network or a wireless data network may use any sort of air interface, such as a code division multiple access (CDMA), time division multiple access (TDMA), frequency division multiple access (FDMA), or orthogonal frequency division multiple access (OFDMA) air interface.

The telecommunication system 100 may also include a number of devices or nodes not illustrated in FIG. 1. Nonlimiting examples of such devices or nodes include an Access Transfer Gateway (ATGW), a serving GPRS support node (SGSN), a gateway GPRS support node (GGSN), a session border controller (SBC), a visitor location register (VLR), an ISBC or IBCF, a BGCF, or a media gateway (MGW), LTE components such as a P-GW or an S-GW, or a non-3GPP-access interworking function (N3IWF). Similarly, throughout this disclosure, other nodes or devices can be used in conjunction with listed nodes or devices. For example, a telecommunications network can include many core network nodes or devices, only some of which implement functions described herein for core network nodes or devices. An IMS may further include a number of devices or nodes not illustrated in FIG. 1, such as a presence server and one or more additional CSCFs. A core network of the telecommunications network may be a GPRS core network or an evolved packet core (EPC) network, or may include elements from both types of core networks.

As used herein, a message "sent to," "transmitted to," or "transmitted toward" a destination, or similar terms, can be sent directly to the destination, or can be sent via one or more intermediate network nodes or devices to the destination. Those intermediate network nodes or devices can include routing device(s). Similarly, a message "received from" a destination can be received directly from the destination, or can be received via one or more intermediate network nodes or devices from the destination. A message passing through one or more intermediate network nodes or devices can be modified by those network nodes or devices, e.g., by adding or removing framing, by changing routing information, or by changing a presentation of at least part of the message, e.g., from a SIP start-line to a SIP header or vice versa. As used herein, a "reply" message is synonymous with a "response" message. The term "reply" is used for clarity, e.g., when discussing reply messages sent in response to the receipt of messages.

Figure 2:
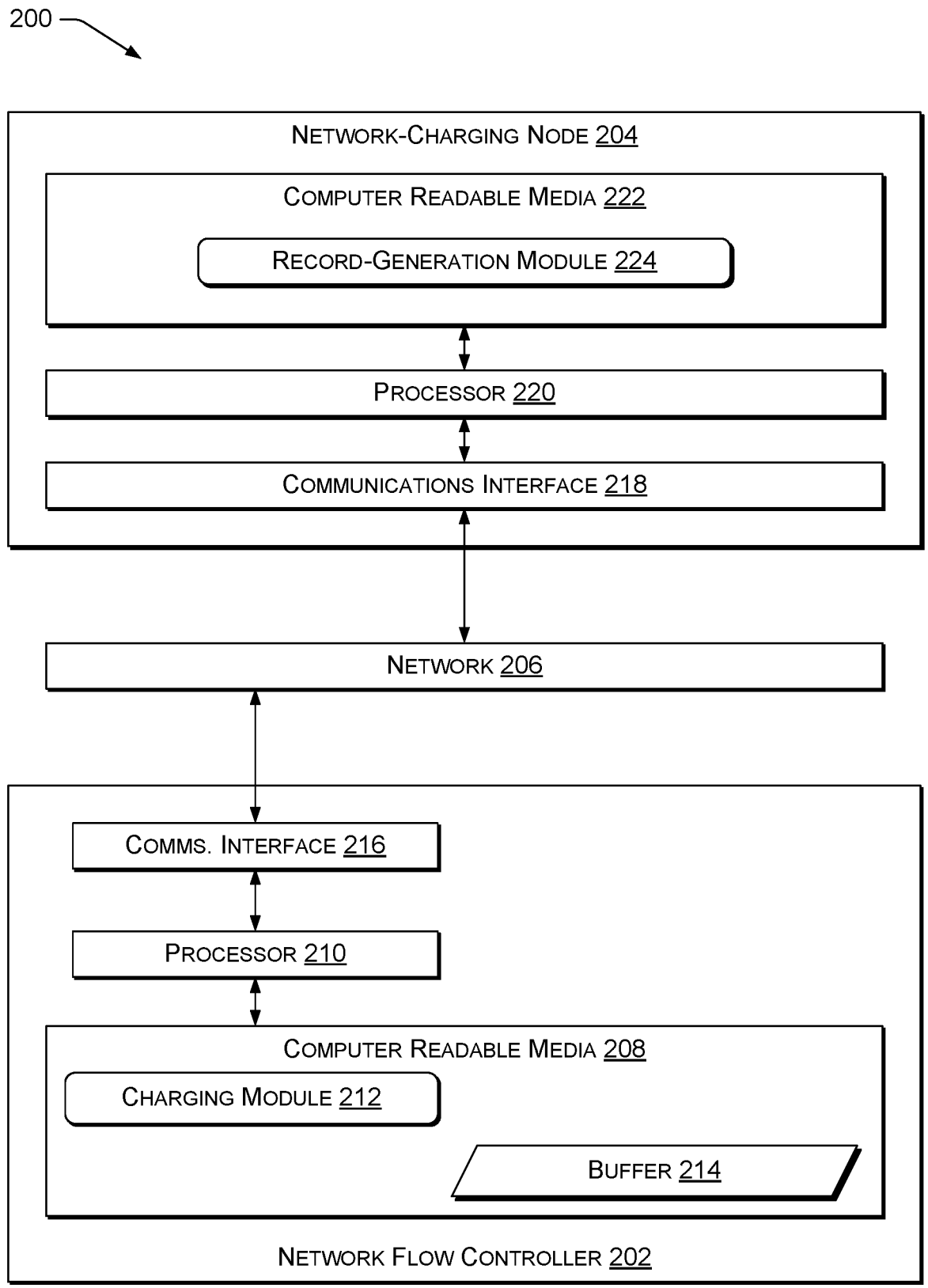
FIG. 2 is a block diagram illustrating components of a system that provides charging management according to some implementations.

FIG. 2 is a block diagram illustrating a telecommunication system 200 permitting media transport and charging management according to some implementations. The telecommunication system 200 includes a network flow controller 202 (which can represent SMF 116), communicatively connectable with a network-charging node 204 (which can represent CHF 118) via a network 206 (which can represent network link 122).

Network flow controller 202 can include one or more computer readable media (CRM) 208, such as memory (e.g., random access memory (RAM), solid state drives (SSDs), or the like), disk drives (e.g., platter-based hard drives), another type of computer-readable media, or any combination thereof. Network flow controller 202 can include one or more processors 210 configured to execute instructions stored on CRM 208. The CRM 208 can be used to store data and to store instructions that are executable by the processors 210 to perform various functions as described herein. The CRM 208 can store various types of instructions and data, such as an operating system, device drivers, etc. The processor-executable instructions can be executed by the processors 210 to perform the various functions described herein.

The CRM 208 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 210. Tangible computer-readable media can include volatile and nonvolatile, removable and non-removable media implemented in any method or technology for storage of information, such as computer readable instructions, data structures, program modules, or other data.

Processor(s) 210 can include, e.g., e.g., one or more processor devices such as central processing units (CPUs), microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). For brevity, processor 210 and, if required, CRM 208, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include processor 220 and, if required, CRM 222, discussed below. Accordingly, functions described as carried out by processor(s) 210 in response to instructions stored on a CRM 208 can additionally or alternatively be performed by a control unit configured to perform functions described herein without reading instructions to do so from CRM 208.

For brevity, discussions of functions performed "by" module(s) refer, in the context of processor-executable instructions, to functions performed in response to processor-executable instructions of the referred-to module(s). In the context of FPGAs or other control units not using processor-executable instructions, discussions of functions performed "by" module(s) refer to functions performed by the special-purpose logic or other configuration of those module(s).

CRM 208 can store processor-executable instructions of a charging module 212. Charging module 212 can comprise instructions that, when executed by processor 210, cause processor 210 to detect charging events (e.g., setup or teardown of sessions), generate or buffer charging-event records, send charging-event records to network-charging node 204, or perform other operations described herein with reference to FIGS. 5,7-10.

The CRM 208 (or another memory of network-charging node 202) can be used to store a buffer 214, e.g., described herein with reference to FIGS. 5 and 7-10.

In some examples, Network flow controller 202 can communicate with (e.g., is communicatively connectable with) network-charging node 204 or other devices via one or more communications interface(s) 216, e.g., network transceivers for wired or wireless networks, or memory interfaces. Example communications interface(s) 216 can include ETHERNET or FIBRE CHANNEL transceivers, WIFI radios, or DDR memory-bus controllers (e.g., for DMA transfers to a network card installed in a physical server). Similarly, network-charging node 204 can communicate with other devices via one or more communications interface(s) 218, which can be of any of the types listed above for communications interface 216.

The network-charging node 204 can include one or more processors 220 and one or more CRM 222. The CRM 222 can additionally or alternatively be used to store processor-executable instructions of a record-generation module 224. The processor-executable instructions can be executed by the one or more processors 220 to perform various functions described herein, e.g., with reference to FIGS. 5 and 11-12. In some examples, network-charging node 204 can be configured to, e.g., by executing the processor-executable instructions, perform functions described herein with reference to FIGS. 5 and 11-12.

Figure 3:
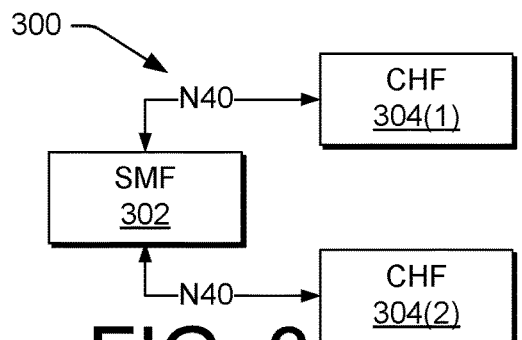
FIG. 3 illustrates a network in a first, normal-operation scenario according to embodiments of the present disclosure

FIG. 3 illustrates a network 300 in a first scenario according to various embodiments of the present disclosure. SMF 302 (which can represent SMF 116) is connected to two CHFs 304(1), 304(2) (individually or collectively referred to with reference 304), either or both of which can represent CHF 118. In various embodiments, the connections are respective N40 (Nchf) interfaces between SMF 302 and each CHF 304. SMF 302 can be connected to any number ≥1 of CHFs via respective N40 interfaces.

The SMF 302 can be or operate as a Charging Trigger Function (CTF), responsible for charging events streaming to a CHF 304. A CHF 304 can be or operate as a Charging Data Function (CDF) and can generate CDRs.

FIG. 3 illustrates an example of a normal-operation scenario. As illustrated in FIG. 3, in normal operation, SMF 302 will stream charging events to CHF(s) 304. CHFs 304 will generate CDRs.

Figure 4:
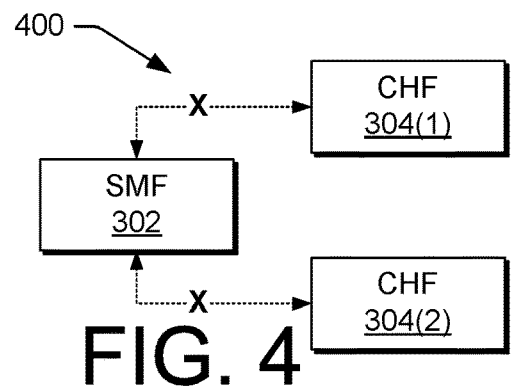
FIG. 4 illustrates a network in a second, error scenario according to embodiments of the present disclosure

FIG. 4 illustrates a network 400 in a second scenario according to various embodiments of the present disclosure. FIG. 4 may illustrate an error scenario, for example. The depicted SMF 302 is unable to communicate with any CHF 304 that is configured to process charging data for particular session(s) or traffic type(s), as indicated by the "X" marks. Accordingly, the SMF 302 may be unable to send charging events to a CHF 304. In some examples, CHF availability is defined with respect to particular network slices or partitions. In some of these examples, the second scenario represents inability of SMF 302 to communicate with a CHF 304 allocated to a particular network slice or partition, even if a CHF from another slice is available via the network.

In various embodiments, the SMF 302 can allow service to users by switching to a temporary "fail-open" mode, e.g., in response to data in a stored configuration file. For example, the SMF 302 can allow service without requesting a quota from a CHF 304, or without receiving such a quota, while no CHF 304 is reachable. The configuration file can specify which service(s) are available during fail-open operation, e.g., VoLTE but not video streaming, in some examples. While operating in fail-open mode, the SMF 302 can record charging events for post-paid billing and for analytics.

In other examples (not shown), the SMF 302 operates in a temporary "fail-closed" mode while no CHF 304 is reachable. In fail-closed mode, SMF 302 denies network service to terminals. In some examples, a configuration file specifies that some services should be fail-closed and others fail-open.

Figure 5:
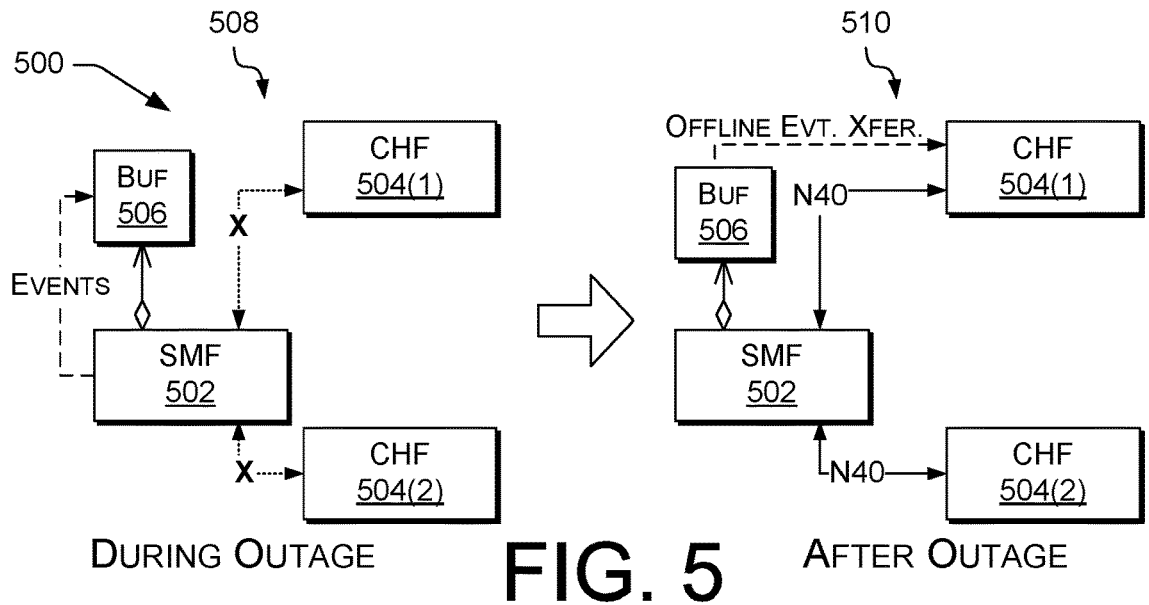
FIG. 5 illustrates a network in a third scenario according to embodiments of the present disclosure.

FIG. 5 illustrates a network 500 in a third scenario according to various embodiments of the present disclosure. Network 500 includes SMF 502 and one or more CHFs 504 (two are shown). SMF 502 includes a buffer ("Buf") 506 (which can represent CRM 208 or a portion thereof, e.g., buffer 214).

In some implementations, the third scenario is a first option for handling charging events when an SMF is unable to access a CHF. Panel 508 shows an example of operations during an outage, e.g., at a time when SMF 502 is unable to communicate with any CHF 504. Panel 510 shows an example of operations after the outage ends, e.g., after connectivity between SMF 502 and at least one CHF 504 has been restored.

In panel 508, in various embodiments, no CHF 504 may be available to the SMF 502 in the network. Additionally or alternatively, any CHF(s) 504 that are available to SMF 502 may be CHF(s) that are not configured to process data for particular session(s) or service(s) managed by SMF 502. The SMF 502 can buffer charging events in buffer 506 and allow service to users based on configuration (fail-open mode).

In panel 510, when a CHF 504 becomes available via the network, or becomes available for handling session(s) or service(s) managed by SMF 502, the SMF 502 can send buffered events having "offline event" flags to CHF 504 on a REST or other interface (e.g., Nchf/N40). This is shown as "Offline Evt. Xfer." In some implementations, the SMF 502 can send these events at an interval. The interval can be a configurable pace out interval, which can reduce effects on normal charging of the sending of the events.

Figure 6:
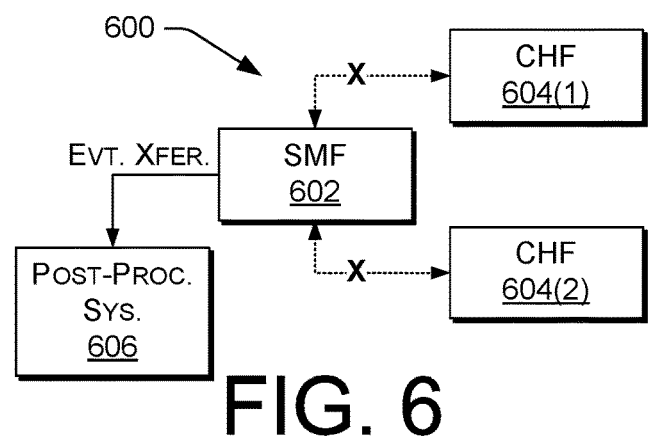
FIG. 6 illustrates a network in a fourth scenario according to embodiments of the present disclosure.

FIG. 6 illustrates a network 600 in a fourth scenario according to embodiments of the present disclosure. In some implementations, the fourth scenario is a second option for handling charging events when an SMF is unable to access a CHF. Network 600 includes SMF 602 and one or more CHFs 604 (two are shown).

An SMF 602 can allow service to subscribers without receiving a quota from a CHF 604 (fail-open). In some embodiments, the SMF 602 will transfer charging events to a different directory.

In certain embodiments, a post-processing system 606 can pull these events. In some implementations, the SMF 602 can push the events to the post processing system 606, e.g., using a Secure File Transfer Protocol (SFTP). This is shown as "Evt. Xfer." The post-processing system 606 can then buffer data for later transfer to a CHF 604, or can produce CDRs directly.

In some embodiments, accordingly, while an SMF cannot access a CHF, the SMF can buffer charging events in local hard disk and then use a separate SFTP mechanism to transfer these events to another system. This system may be a Post Processing Server. This system can be another CHF or can be any other system that will do post processing of these offline charging events and send them to a billing-domain node. In this second approach, a pull mechanism or a push mechanism can be implemented between the SMF and the system. Various examples of the fourth scenario avoid adding to the load on existing REST interfaces.

Illustrative Operations

Figure 7:
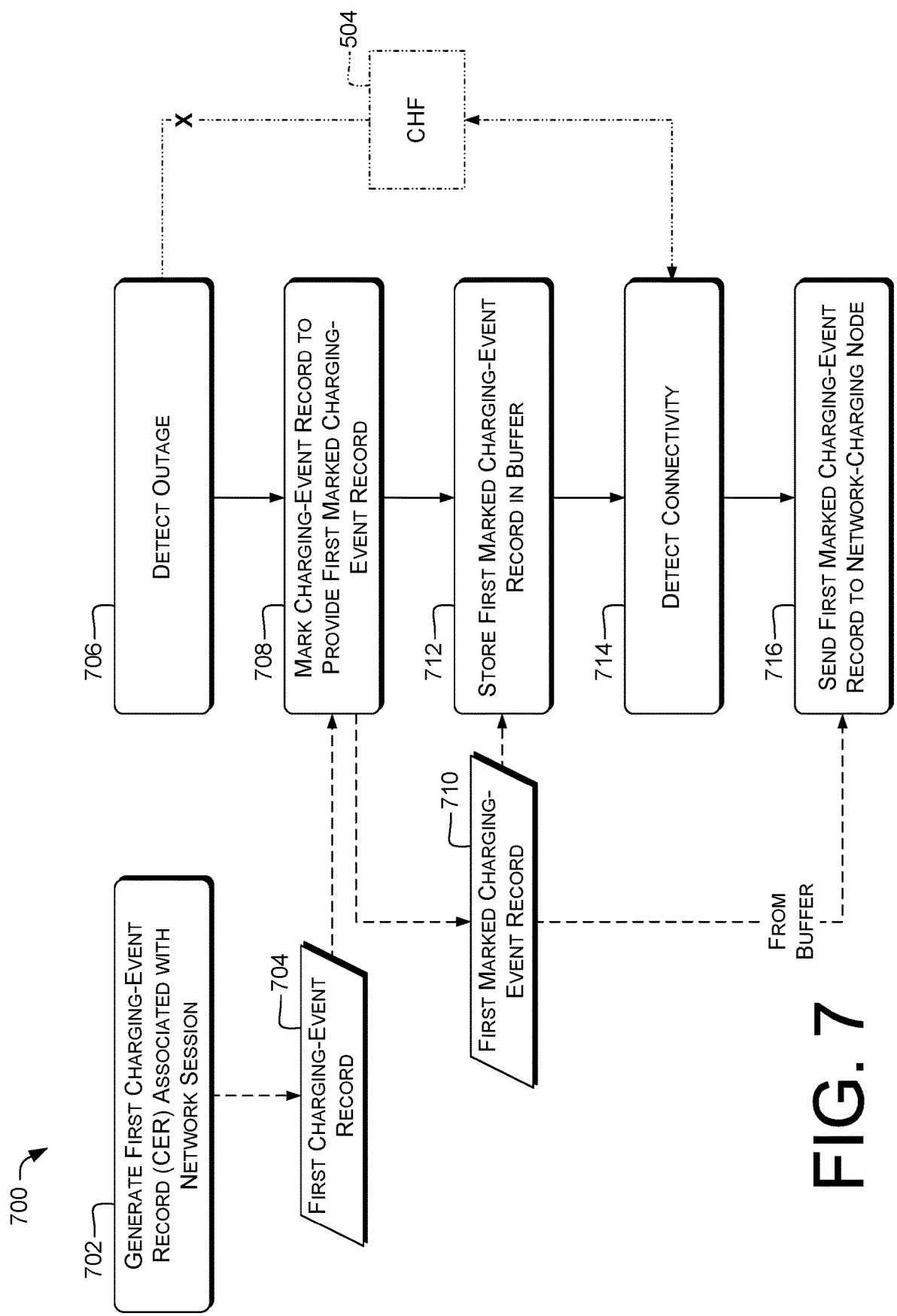
FIG. 7 illustrates an example charging-management process performed in a telecommunications network.

FIG. 7 is a dataflow diagram illustrating an example process 700 for charging management and related data items. For clarity, dataflow is shown dashed throughout FIGS. 7-12. Process 700 can be performed, e.g., by a network flow controller or other control device such as an SMF 116, 502 or network flow controller 202 of a telecommunication system 200, e.g., including communications interface 216. Network flow controller 202 can communicate with a network-charging node, e.g., a CHF.

Network flow controller 202 can include at least one processor 210 and at least one CRM 208, or another control unit. Network flow controller 202 can additionally include a buffer 214, 506. In some examples, network flow controller 202 includes control unit(s) configured to perform operations described below, e.g., in response to computer program instructions of the charging module 212.

Operations shown in FIG. 7 and in FIGS. 8-12, discussed below, can be performed in any order except when otherwise specified, or when data from an earlier step is used in a later step. For clarity of explanation, reference is herein made to various components shown in FIGS. 1, 2, and 5 that can carry out or participate in the steps of the example methods. It should be noted, however, that other components can be used; that is, example method(s) shown in FIGS. 7-12 are not limited to being carried out by the identified components, and are not limited to including the identified operations or messages.

Some operations herein are mutually independent, i.e., neither requires as input any output of the other. Operations described herein as "mutually independent" (e.g., within a group of operations such as those of a method) can be performed in either order, in parallel, at least partly overlapping in time, or partly or wholly as a combined operation, in various examples. A later-run operation of two mutually independent operations may accept input(s) from the earlier-run of the two mutually independent operations, but is not required to wait for those input(s) or for completion of the earlier-run operation before executing.

At 702, the control unit can generate a first charging-event record (CER) 704 associated with a network session. For example, the control unit can perform CTF operations, e.g., as specified in 3GPP and ETSI standards for LTE and 5G cellular networks. The control unit can perform CTF functions or other charging functions described in 32.240, 32.255, or 29.513, in various examples. Operation 702 can include determining a ChargingDataRequest structure (32.291 v15.0.0 § 6.1.6.2.1.1). In some examples, operation 702 is performed before an outage begins; in other examples, operation 702 is performed after an outage begins.

At 706, the control unit can detect an outage at least partly by determining that no network-charging node (e.g., CHF 504, shown in phantom) is available to receive the first CER 704. Operations 702 and 706 are mutually independent in some examples. For example, the control unit can query network-charging node(s) and receive "out of service" responses; can determine that at least a predetermined time has elapsed since heartbeat message(s) were last received from network-charging node(s); can query a Network Resource Function (NRF) for address(es) of network-charging node(s) and receive an error or an indication that no network-charging node(s) are available; can attempt to send first CER 704 to one or more network-charging node(s) and receive respective network-failure messages (e.g., ICMP messages such as Host Unreachable) or error messages (e.g., 4xx or 5xx); or any combination of those.

In some examples, during the outage, network flow controller 202 is unable to communicate with any network-charging node (e.g., the scenario shown in FIG. 4). In other examples, during the outage, network flow controller 202 is able to communicate with network-charging node(s) 204, but those network-charging node(s) 204 will not receive (e.g., will respond with a 4xx or 5xx to) the first CER 704. For example, the first CER 704 may be associated with a first network slice, and the reachable network-charging node(s) may be exclusively assigned to a second, different network slice. Additionally or alternatively, the reachable network-charging node(s) may not be configured to process records associated with the particular session, service, protocol, or terminal indicated in the first CER 704.

In some examples, the outage is a general outage, e.g., due to failure of communications interface 216 or of a network link that is the sole link connecting network flow controller 202 to network-charging node(s) 204 that can receive first CER 704. In other examples, the outage is a specific outage, e.g., due to failures on network link(s) connecting network flow controller 202 to network-charging node(s) 204 that can receive first CER 704. During a specific outage, the control unit may be able to communicate with nodes other than the network-charging node(s) that can receive first CER 704.

At 708, the control unit can mark the first CER 704 to provide a first marked CER 710. Operation 708 can be performed in response to the detection of the outage at operation 706. For example, operation 708 can include changing data in (or adding data, e.g., a JSON field, to) the first CER 704 to produce the first marked CER 710, or storing the first CER 704 in association with metadata, the data plus metadata being the first marked CER 710.

At 712, the control unit can store the first marked CER 710 in a buffer (e.g., buffer 214, 506). For example, the control unit can write the first marked CER 710 to a file in a directory on a filesystem of a hard drive or Flash drive.

At 714, the control unit can detect connectivity (e.g. SMF-CHF connectivity) at least partly by determining that a network-charging node (e.g., CHF 504) is available to receive the first marked CER 710. Operation 714 can be performed after the marking (operation 708). For example, the control unit can query network-charging node(s) and receive "in service" responses; can receive heartbeat message(s) from network-charging node(s); can query an NRF for address(es) of network-charging node(s) and receive indication(s) that network-charging node(s) are available; can attempt to send first CER 704 to one or more network-charging node(s) and receive respective success messages (e.g., 2xx); or any combination of those.

At 716, the control unit can send the first marked CER 710 to the network-charging node in response to the detection of the connectivity at operation 714. Operation 716 can include, e.g., retrieving the first marked CER 710 from the buffer. For example, the control unit can send an Nchf_ConvergedCharging_Create or Nchf_ConvergedCharging_Update message to a CHF 504 or other network-charging node, or can send another message indicated in, e.g., 3GPP 32.290 or 32.291. Operation 716 can include sending the message via any appropriate transport protocol, e.g., UDP, TCP, QUIC, or SCTP, using any appropriate application protocol, e.g., HTTP or SS7-over-M3UA (SIGTRAN). Operation 716 can permit sending buffered events for fail-open sessions after connectivity is restored, for example.

In some examples, operation 714 and operation 716 can be combined in a single operation. For example, after the marking (operation 708), the control unit can perform operations 714 and 716 in either order, or combined. In some examples, the control unit performs operation 716 repeatedly, e.g., at a predetermined time interval, until the control unit receives a positive reply (e.g., a 200 OK) from the network-charging node. The control unit can then perform operation 714, detecting connectivity in response to the positive reply.

Figure 8:
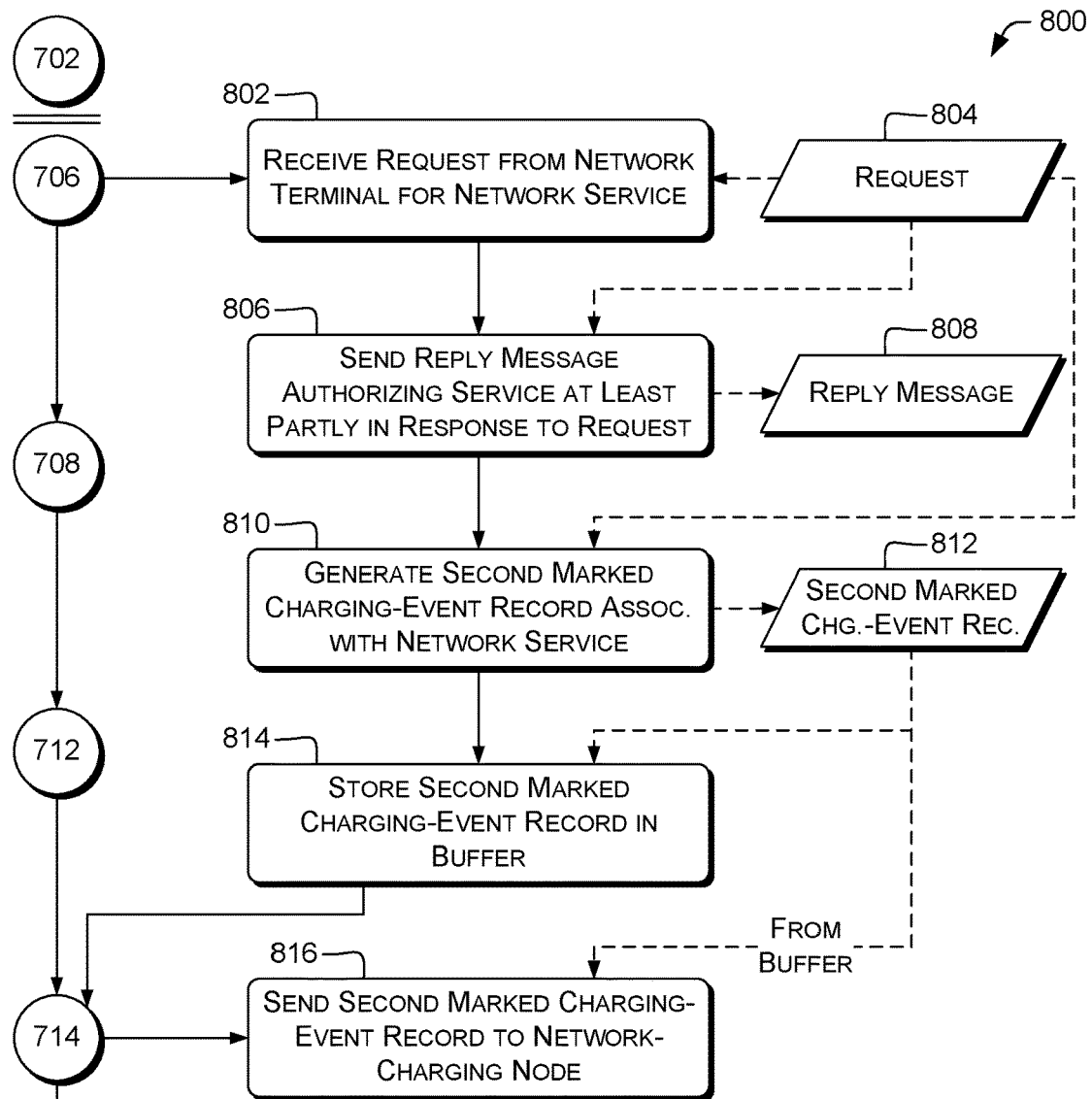
FIG. 8 illustrates example charging-management processes, and interactions between a flow controller and other network components.

FIG. 8 is a dataflow diagram illustrating example processes 800 performed by network flow controller(s) 202 for charging control, and related data items. In some examples, network flow controllers 202, e.g., SMF(s) 116, include control unit(s) configured to perform operations described below, e.g., in response to computer program instructions of the charging module 212. In some examples, at least: operations 802-814 are performed after operation 706 and before operation 714; operation 816 is performed after operation 714; or operation 716 includes operations 818 and 824. Some examples permit handling service requests during an outage (a "fail open" configuration in which the outage does not close off at least one network service).

At 802, the control unit can receive a request 804 from a network terminal for a network service. For example, the control unit can receive a SIP INVITE or SIP MESSAGE request from a network terminal requesting creation of a network session or other data transfer (e.g., SMS). In some examples, the control unit can receive a message from a UPF, e.g., a Packet Flow Control Protocol (PFCP) Association Setup message.

At 806, the control unit can send a reply message 808 at least partly in response to the request 804. The reply message 808 can authorize the network service. For example, the control unit can send a SIP 200 OK response to the terminal, or a PFCP Association Setup Response to the UPF. Additionally or alternatively, the reply message 808 can include a second SIP INVITE, and operation 806 can include sending the second SIP INVITE to another network node to continue establishing the requested session or transmitting the requested data.

At 810, the control unit can generate a second marked CER 812. Examples are discussed herein, e.g., with reference to operation 708. The second marked CER 812 can be associated with the network service. For example, the second marked CER 812 can indicate the request for the service, resources requested for the service, the identity of the terminal (e.g., IMEI or GUTI) or the user (e.g., IMSI or MS-ISDN), or other charging information such as that described in the 3GPP specifications referenced in the discussion of FIG. 7.

At 814, the control unit can store the second marked CER 812 in the buffer 214. Examples are discussed herein, e.g., with reference to operation 712.

At 816, the control unit can send the second marked CER 812 to the network-charging node. Operation 816 can be performed after detecting the connectivity (operation 714). Examples are discussed herein, e.g., with reference to operation 716.

In some examples, sending the first marked charging-event record 710 (operation 716) is performed at least partly using operations 818 and 824.

At 818, the control unit can determine a network message 820 based at least in part on the first marked charging-event record 710. The network message 820 can be, e.g., an HTTP request (e.g., an HTTP/2+TLS request). In some examples, the network message 820 can include a body, e.g., a JSON, YAML, TOML, INI, or other structured-text body, or a multipart body. The network message 820 including the body can be, e.g., an HTTP POST or PUT.

The network message 820 can include an indication 822 that the first marked CER 710 could not be transmitted during the outage. The indication 822 can include a header of the network message, e.g., a custom HTTP header such as "X-Buffered-Event: true". Additionally or alternatively, the indication 822 can include a field in a structured-text body of the network message, such as the JSON fragment "{ . . . "bufferedEvent": true . . . }". Additionally or alternatively, the indication 822 can include a part of multiple parts included in the network message 820. For example, the network message 820 can include a multipart/mixed body. One of the parts can be a structured-text part including the indication 822.

At 824, the control unit can send the network message 820 via the communications interface 216. Examples are discussed herein, e.g., with reference to operation 716.

Figure 9:
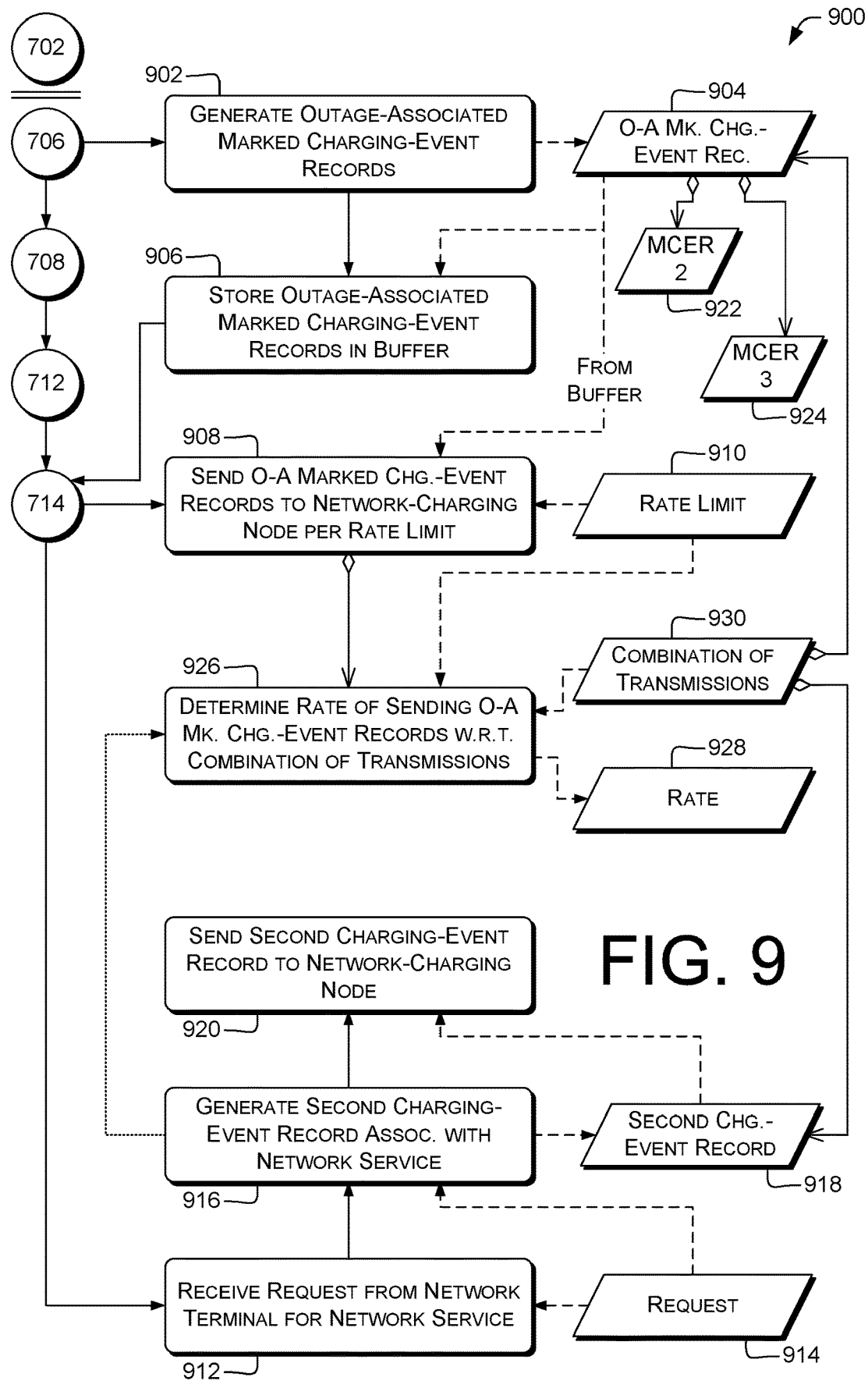
FIG. 9 illustrates example charging-management processes, and interactions between a flow controller and a network-charging node.

FIG. 9 is a dataflow diagram illustrating example processes 900 performed by network flow controllers 202 for charging control, and related data items. In some examples, network flow controllers 202, e.g., SMF(s) 116, include control unit(s) configured to perform operations described below, e.g., in response to computer program instructions of the charging module 212. In some examples, at least: operations 902 and 906 can be performed after operation 706 and before operation 714; operation 908 can be performed after operation 714; operations 912-920 can be performed after operation 714; operation 908 can include operation 926; operation 926 can be performed after operation 916 (arrow shown stippled for clarity).

At 902, the control unit can generate one or more outage-associated marked CERs 904. Examples are discussed herein, e.g., with reference to operations 708, 810. The outage-associated marked CERs 904 can be marked CERs for services requested during the outage. For example, the control unit can receive requests (e.g., request 804) and generate corresponding outage-associated marked CERs 904.

At 906, the control unit can store the one or more outage-associated marked CERs 904 in the buffer. Examples are discussed herein, e.g., with reference to operations 712, 814.

In some examples, a network-charging node (e.g., CHF 504) may have a limited capacity to process incoming CERs. Some of these examples use operation 908, or operations 908 and 926 (discussed below).

At 908, the control unit can send the outage-associated marked CERs 904 to the network-charging node. For example, upon restoration of connectivity, the buffered outage-associated marked CERs 904 or other buffered marked CERs can be transmitted. Examples are discussed herein, e.g., with reference to operations 716, 816. In some examples, operation 908 can include operation 716.

Operation 908 can include transmitting the outage-associated marked CERs 904 successively (e.g., one at a time, or N at a time for N smaller than the number of outage-associated marked CERs 904), in compliance with a predetermined rate limit 910. For example, the rate limit 910 can be expressed in CERs/s, network packets/s (if, e.g., a CER is fragmented or segmented into multiple packets), bits/s, percent usage (e.g., packets/s or bits/s) of a network link to the network-charging node, or percent usage (e.g., packets/s or bits/s) of processing or storage resources at the network-charging node. In some examples, the rate limit 910 applies to transmissions to a single network-charging node; in other examples, the rate limit 910 applies to the aggregate of transmissions to multiple network-charging nodes, e.g., nodes that are connected in a load-balancing arrangement. Obeying the rate limit can reduce the effect of operation 908 on transmission of new charging data on Nchf, or can avoid increasing load or creating congestion on this interface.

In some examples, the control unit processes new service requests (operations 912-920), or transmits buffered CERs while also processing new service requests (operations 912-920, 926).

At 912, the control unit can receive a request 914 from a network terminal 102 for a network service. Examples are discussed herein, e.g., with reference to operation 802. In some examples, omitted for brevity, the control unit can send a reply message at least partly in response to the request 914, e.g., a reply message authorizing the network service. Examples are discussed herein, e.g., with reference to operation 806.

At 916, the control unit can generate a second CER 918, the second CER 918 associated with the network service. In some examples, the second CER 918 is not a marked CER, e.g., because second CER 918 was determined during a period of connectivity instead of during an outage. Examples are discussed herein, e.g., with reference to operation 702.

At 920, the control unit can send the second CER 918 to the network-charging node. Examples are discussed herein, e.g., with reference to operations 716, 816. In some examples, the second CER 918 is sent as a marked CER would be, except without a custom header or other indication 822 that the second CER 918 could not be transmitted during an outage.

In some examples, the one or more outage-associated marked CERs 904 comprise a second marked CER 922 ("MCER") and a third marked CER 924. The second marked CER 922 is sent to the network-charging node before the second CER 918, and the second CER 918 is sent to the network-charging node before the third marked CER 924. In this example, the order of transmission of CERs is 922, 918, 924. The successively sending (operation 908) includes operation 926.

At 926, the control unit can determine a rate 928 of sending the outage-associated marked CERs 904 so that a combination 930 of transmissions complies with the predetermined rate limit 910. The combination 930 of transmissions includes at least: the sending (operation 908) of at least some of the outage-associated marked CERs 904 (e.g., at least CERs 922, 924), and the sending (operation 920) of the second CER 918. For example, the control unit can delay sending the third marked CER 924 to allow room within the rate limit 910 for the second CER 918.

Figure 10:
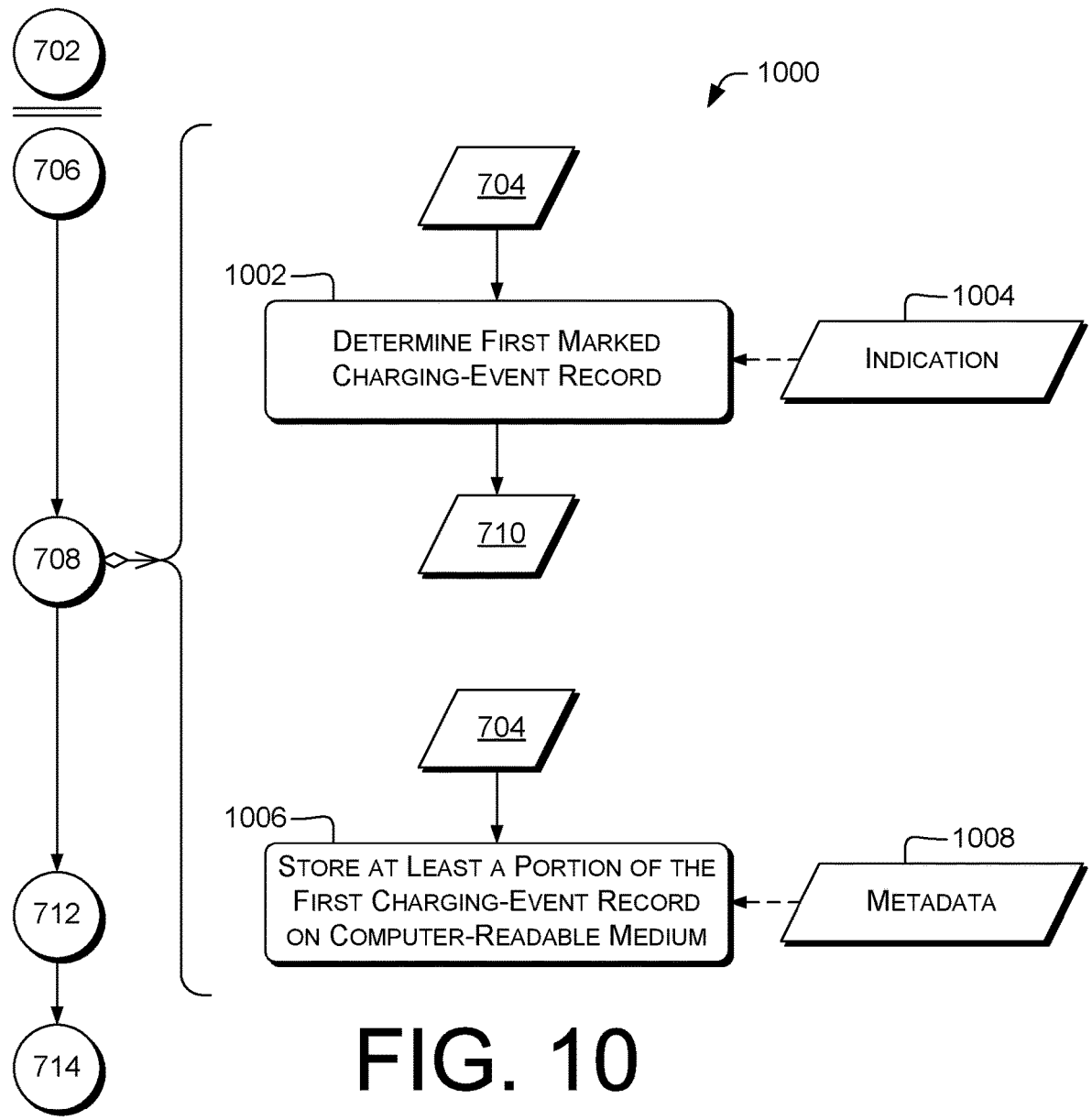
FIG. 10 illustrates example charging-management processes that can be, e.g., carried out during an outage.

FIG. 10 is a dataflow diagram illustrating example processes 1000 performed by network flow controllers 202 for charging control, and related data items. In some examples, network flow controllers 202, e.g., SMF(s) 116, include control unit(s) configured to perform operations described below, e.g., in response to computer program instructions of the charging module 212. In some examples, at least: operation 708 (marking the first CER 704) includes operation 1002; or operation 708 includes operation 1006.

At 1002, the control unit can determine the first marked CER 710 comprising: at least some data from the first CER 704; and an indication 1004 that the first CER could not be transmitted during the outage. Indication 1004 can include, e.g., a Boolean value or other flag; a tag (e.g., string or numeric); or an information element or other type-length-value or tag-length-value (TLV) item. Operation 1002 can additionally include storing the first marked CER 710 on CRM 208.

In some examples using operation 1002, operation 716 can include streaming the first marked CER 710 off CRM 208, or otherwise transmitting an already-generated first marked CER 710. For example, operation 1002 can include determining a structured-text body having indication 822, and operation 716 can include transmitting that body.

At 1006, the control unit can store at least a portion of the first CER 704 on a CRM 208 in association with metadata 1008 indicating that the first CER 704 could not be transmitted during the outage. In some examples, the at least a portion of the first CER 704 can be stored in a data file, a database field (e.g., a BLOB), or a database record. Metadata 1008 can include a field in a flat-file, SQL, or other database of CERs; a separate file accompanying the data file; or a file attribute or extended attribute on a file storing the at least some data from the first CER 704. A separate metadata file can include, e.g., structured text associating (e.g., by filename, inode number, or other filesystem-related information) an indication 822, 1004 with the data file. File attributes or extended attributes can include, e.g., creation time, last-modification time, or a dedicated attribute (e.g., a new LINUX inode bit such as 0200000, above S_IFMT, set to indicate that the corresponding file is a marked CER).

In some examples using operation 1006, operation 716 can include generating or assembling the first marked CER 710. For example, operation 716 can include reading the data file, reading the metadata, and modifying the read data, e.g., by adding a structured-text field or an additional part, to provide the first marked CER 710 to be transmitted.

Figure 11:
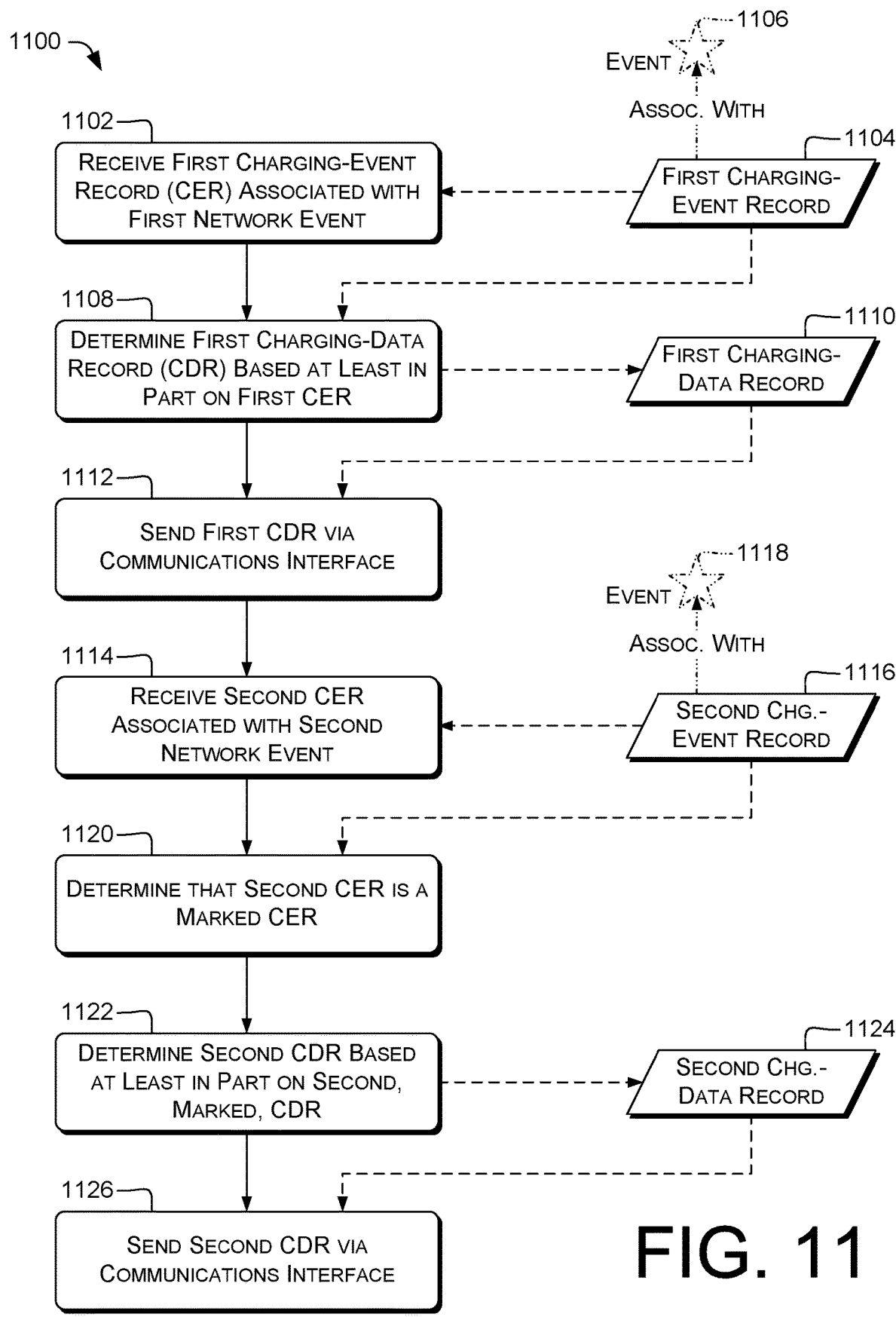
FIG. 11 illustrates an example process for managing charging records.

FIG. 11 is a dataflow diagram illustrating an example process 1100 for processing charging records, and related data items. Process 1100 can be performed, e.g., by a control device or other core network device such as a network-charging node 204 of a telecommunication system 200, e.g., including communications interface 218. Network-charging node 204 can be or include, e.g., a network-charging node such as CHF 118, 504. Network-charging node 204 can communicate with a network flow controller 202, e.g., an SMF such as SMF 116, 502. The control unit can include at least one processor 220, in some examples. Process 1100 can be performed, e.g., in response to computer program instructions of the record-generation module 224. In some examples, process 1100 can be performed in a network configuration such as that shown in panel 510.

At 1102, the control unit can receive, via communications interface 218, a first CER 1104 associated with a first network event 1106 (shown in phantom; depicted as a star). For example, the control unit can receive an Nchf_ConvergedCharging_Create or Nchf_ConvergedCharging_Update message from an event-information source, such as an SMF 116, 502 or other CTF. First CER 1104 can include a structured-text or other body carried in the Nchf_* message. First CER 1104 can indicate the beginning or end of a session (e.g., in session-based charging), or can provide data regarding an ongoing session. In some examples, first CER 1104 is sent substantially upon its generation in the CTF, or otherwise without having first been marked and stored in a buffer 214, 506.

At 1108, the control unit can determine a first charging-data record (CDR) 1110 based at least in part on the first CER 1104. For example, the control unit can determine one or more CDR information elements (IEs) such as those described in 3GPP 32.298 v15.4.0 and pack those IEs into a CDR format such as those described in 3GPP 32.297 v15.1.0.

At 1112, the control unit can send the first CDR 1110 via the communications interface 218. For example, the control unit can send the first CDR 1110 to a billing-domain system via a Bx interface, or to a charging-gateway function (CGF) via a Ga interface.

At 1114, the control unit can receive, via the communications interface from an event-information source, e.g., SMF 502, a second charging-event record 1116 associated with a second network event 1118 (shown in phantom). Examples are discussed herein, e.g., with reference FIG. 5, panel 510, "offline event transfer" from buffer 506 to CHF 504(1).

At 1120, the control unit can determine that the second CER 1116 is a marked CER. For example, the control unit can locate, in the contents of second CER 1116, an indication 822, 1004 or other mark data.

At 1122, the control unit can determine, at least partly in response to the determination at operation 1120, a second CDR 1124 based at least in part on the second CER 1116. The second CDR 1124 can indicate that the second network event occurred during an outage of communication between the event-information source and the control unit (e.g., a scenario such as that shown in FIG. 4 or panel 508). Examples of CDR determination are discussed herein, e.g., with reference to operation 1108.

At 1126, the control unit can send the second CDR 1124 via the communications interface 218. Examples are discussed herein, e.g., with reference to operation 1112.

FIG. 12 is a dataflow diagram illustrating example processes 1200 performed by network-charging node(s) 204 for processing charging records, and related data items. In some examples, network-charging node(s) 204, e.g., CHF(s) 118, 504, include control unit(s) configured to perform operations described below, e.g., in response to computer program instructions of the record-generation module 224. In some examples, at least: operation 1120 includes or is preceded by operation 1202; operation 1120 includes operation 1206; or operation 1122 includes operation 1210.

At 1202, the control unit can receive the second CER 1116 in a network message 1204, e.g., an HTTP message. Examples of network messages are discussed herein, e.g., with reference to operation 818 or network message 820. Operation 1202 can include receiving the network message via any of the formats described herein with reference to operation 818 or network message 820, or via any of the protocols or layers (e.g., TLS) described herein with reference to operations 716, 824.

At 1206, the control unit can determine that the second CER 1116 is a marked CER at least partly by determining that the second CER 1116 comprises an indication 1208 that the second CER 1116 was captured during an outage. In some examples, the indication 1208 comprises at least one of: a header of the network message 1204; a field in a structured-text body of the network message 1204; or a part of multiple parts included in the network message 1204. Examples are discussed herein, e.g., with reference to indication 822, 1004.

At 1210, the control unit can determine the second CDR 1124 including an information element (IE) 1212 indicating that the second network event 1118 occurred during the outage. IE 1212 can include, e.g., data encoded in the ASN.1 Basic Encoding Rules (BER), unaligned or aligned Packed Encoding Rules (PER), or XER (3GPP 32.297 v15.1.0 § 6.1.2.4). Additionally or alternatively, IE 1212 can include a type field, a length field, and a value field. The value field can include a value of any of the types described herein with reference to indication 1004.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A method comprising, by a network flow controller: generating a first charging-event record associated with a network session; detecting an outage at least partly by determining that no network-charging node is available to receive the first charging-event record; in response to the detection of the outage, marking the first charging-event record to provide a first marked charging-event record; storing the first marked charging-event record in a buffer; after the marking, detecting connectivity at least partly by determining that a network-charging node is available to receive the first marked charging-event record; and in response to the detection of the connectivity, sending the first marked charging-event record to the network-charging node.

B: The method according to paragraph A, further comprising, by the network flow controller, after detecting the outage and before detecting the connectivity: receiving a request from a network terminal for a network service; sending a reply message in response to the request, the reply message authorizing the network service; generating a second marked charging-event record, the second marked charging-event record associated with the network service; and storing the second marked charging-event record in the buffer.

C: The method according to paragraph B, further comprising, by the network flow controller, after detecting the connectivity, sending the second marked charging-event record to the network-charging node.

D: The method according to any of paragraphs A-C, further comprising, by the network flow controller, after detecting the outage and before detecting the connectivity: generating one or more outage-associated marked charging-event records; and storing the one or more outage-associated marked charging-event records in the buffer.

E: The method according to paragraph D, further comprising, by the network flow controller, after detecting the connectivity, successively sending the outage-associated marked charging-event records to the network-charging node in compliance with a predetermined rate limit.

F: The method according to paragraph E, wherein: the method further comprises, by the network flow controller, after detecting the connectivity: receiving a request from a network terminal for a network service; generating a second charging-event record, the second charging-event record associated with the network service; and sending the second charging-event record to the network-charging node; the one or more outage-associated marked charging-event records comprise a second marked charging-event record and a third marked charging-event record; the second marked charging-event record is sent to the network-charging node before the second charging-event record; the second charging-event record is sent to the network-charging node before the third marked charging-event record; and the successively sending comprises determining a rate of sending the outage-associated marked charging-event records so that a combination of transmissions complies with the predetermined rate limit, the combination of transmissions comprising: the sending of the outage-associated marked charging-event records; and the sending of the second charging-event record.

G: The method according to any of paragraphs A-F, wherein: the sending the first marked charging-event record further comprises, by the network flow controller: determining a network message based at least in part on the first marked charging-event record, the network message comprising an indication that the first charging-event record could not be transmitted during the outage; and sending the network message via the communications interface; and the indication comprises at least one of: a header of the network message; a field in a structured-text body of the network message; or a part of multiple parts included in the network message.

H: The method according to any of paragraphs A-G, wherein the marking comprises at least: determining the first marked charging-event record comprising: at least some data from the first charging-event record; and an indication that the first charging-event record could not be transmitted during the outage; or storing at least a portion of the first charging-event record on a computer-readable medium in association with metadata indicating that the first charging-event record could not be transmitted during the outage.

I: The method according to any of paragraphs A-H, wherein the network flow controller comprises a Session Management Function (SMF) and the network-charging node comprises a Charging Function (CHF).

J: A network device, comprising: a communications interface; a buffer; at least one processor; and at least one computer-readable medium storing instructions executable by the at least one processor to cause the at least one processor to perform operations comprising: generating a first charging-event record associated with a network session; detecting an outage at least partly by determining that no network-charging node is available to receive the first charging-event record via the communications interface; in response to the detection of the outage, marking the first charging-event record to provide a first marked charging-event record; storing the first marked charging-event record in the buffer; after the marking, detecting connectivity at least partly by determining that a network-charging node is available to receive the first marked charging-event record via the communications interface; and in response to the detection of the connectivity, sending the first marked charging-event record to the network-charging node via the communications interface.

K: The network device according to paragraph J, the operations further comprising, after detecting the outage and before detecting the connectivity: receiving a request from a network terminal for a network service; sending a reply message in response to the request, the reply message authorizing the network service; generating a second marked charging-event record, the second marked charging-event record associated with the network service; and storing the second marked charging-event record in the buffer.

L: The network device according to paragraph K, the operations further comprising, after detecting the connectivity, sending the second marked charging-event record to the network-charging node.

M: The network device according to any of paragraphs J-L, the operations further comprising, after detecting the outage and before detecting the connectivity: generating one or more outage-associated marked charging-event records; and storing the one or more outage-associated marked charging-event records in the buffer.

N: The network device according to paragraph M, further comprising, by the network device, after detecting the connectivity, successively sending the outage-associated marked charging-event records to the network-charging node in compliance with a predetermined rate limit.

O: The network device according to paragraph N, wherein: the operations further comprise, after detecting the connectivity: receiving a request from a network terminal for a network service; generating a second charging-event record, the second charging-event record associated with the network service; and sending the second charging-event record to the network-charging node; the one or more outage-associated marked charging-event records comprise a second marked charging-event record and a third marked charging-event record; the second marked charging-event record is sent to the network-charging node before the second charging-event record; the second charging-event record is sent to the network-charging node before the third marked charging-event record; and the operations for successively sending comprise operations for determining a rate of sending the outage-associated marked charging-event records so that a combination of transmissions complies with the predetermined rate limit, the combination of transmissions comprising: the sending of the outage-associated marked charging-event records; and the sending of the second charging-event record.

P: The network device according to any of paragraphs J-O, wherein: the operations for sending the first marked charging-event record further comprise: determining a network message based at least in part on the first marked charging-event record, the network message comprising an indication that the first charging-event record could not be transmitted during the outage; and sending the network message via the communications interface; and the indication comprises at least one of: a header of the network message; a field in a structured-text body of the network message; or a part of multiple parts included in the network message.

Q: The network device according to any of paragraphs J-P, wherein the network device comprises a Session Management Function (SMF) and the network-charging node comprises a Charging Function (CHF).

R: At least one tangible, non-transitory computer-readable medium storing instructions that, when executed by at least one processor, cause the at least one processor to perform operations comprising: receiving, via a communications interface, a first charging-event record associated with a first network event; determining a first charging-data record based at least in part on the first charging-event record; sending the first charging-data record via the communications interface; receiving, via the communications interface from an event-information source, a second charging-event record associated with a second network event; determining that the second charging-event record is a marked charging-event record; determining, at least partly in response, a second charging-data record based at least in part on the second charging-event record, the second charging-data record indicating that the second network event occurred during an outage of communication between the event-information source and the at least one processor; and sending the second charging-data record via the communications interface.

S: The at least one tangible, non-transitory computer-readable medium according to paragraph R, wherein: the operations further comprise: receiving the second charging-event record in a network message; and determining that the second charging-event record is a marked charging-event record at least partly by determining that the second charging-event record comprises an indication that the second charging-event record was captured during the outage; and the indication comprises at least one of: a header of the network message; a field in a structured-text body of the network message; or a part of multiple parts included in the network message.

T: The at least one tangible, non-transitory computer-readable medium according to paragraph R or S, the operations comprising determining the second charging-data record including an information element (IE) indicating that the second network event occurred during the outage.

U: A method comprising, by a network flow controller: generating a first charging-event record associated with a network session; detecting an outage at least partly by determining that no network-charging node is available to receive the first charging-event record; in response to the detection of the outage, marking the first charging-event record to provide a first marked charging-event record; storing the first marked charging-event record in a buffer; and after the marking: detecting connectivity at least partly by determining that a network-charging node is available to receive the first marked charging-event record; and sending the first marked charging-event record to the network-charging node.

V: A system comprising: a first network device configured to perform acts as recited in any of paragraphs A-I, J-Q, or U, and a second network device configured to perform acts as recited in any of paragraphs R-T.

W: A device comprising: a processor; and a computer-readable medium, e.g., a computer storage medium, having thereon computer-executable instructions, the computer-executable instructions upon execution by the processor configuring the device to perform operations as any of paragraphs A-I, J-Q, R-T, or U recites.

X: A system comprising: means for processing; and means for storing having thereon computer-executable instructions, the computer-executable instructions including means to configure the system to carry out a method as any of paragraphs A-I, J-Q, R-T, or U recites.

Y: A network control device configured to perform operations as any of paragraphs A-I, J-Q, R-T, or U recites.

Z: A method comprising performing operations as any of paragraphs A-I, J-Q, R-T, or U recites.

CONCLUSION

Many variations and modifications can be made to the above-described examples, the elements of which are to be understood as being among other acceptable examples. All such modifications and variations are intended to be included herein within the scope of this disclosure and protected by the claims. Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

The methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem.

Example computer-implemented operations described herein can additionally or alternatively be embodied in specialized computer hardware, e.g., FPGAs. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A method comprising, by a network flow controller:
   generating a first charging-event record associated with a network session;
   detecting an outage at least partly by determining that no network-charging node is available to receive the first charging-event record;
   in response to the detection of the outage, marking the first charging-event record to provide a first marked charging-event record;
   storing the first marked charging-event record in a buffer;
   receiving a request from a network terminal for a network service;
   sending a reply message in response to the request, the reply message authorizing the network service;
   generating a second marked charqinq-event record, the second marked charging-event record associated with the network service;
   storing the second marked charging-event record in the buffer;
   after the marking, detecting connectivity at least partly by determining that a network-charging node is available to receive the first marked charging-event record; and
   in response to the detection of the connectivity, sending the first marked charging-event record to the network-charging node.

2. The method according to claim 1, further comprising, by the network flow controller, after detecting the connectivity, sending the second marked charging-event record to the network-charging node.

3. The method according to claim 1, further comprising, by the network flow controller, after detecting the outage and before detecting the connectivity:
   generating one or more outage-associated marked charging-event records; and
   storing the one or more outage-associated marked charging-event records in the buffer.

4. The method according to claim 3, further comprising, by the network flow controller, after detecting the connectivity, successively sending the outage-associated marked charging-event records to the network-charging node in compliance with a predetermined rate limit.

5. The method according to claim 4, wherein:
   the method further comprises, by the network flow controller, after detecting the connectivity:
      receiving a request from a network terminal for a network service;
      generating a second charging-event record, the second charging-event record associated with the network service; and
      sending the second charging-event record to the network-charging node;
   the one or more outage-associated marked charging-event records comprise the first marked charging-event record and second marked charging-event record;
   the first marked charging-event record is sent to the network-charging node before the second charging-event record;
   the second charging-event record is sent to the network-charging node before the second marked charging-event record; and
   the successively sending comprises determining a rate of sending the outage-associated marked charging-event records so that a combination of transmissions complies with the predetermined rate limit, the combination of transmissions comprising:
      the sending of the outage-associated marked charging-event records; and
      the sending of the second charging-event record.

6. The method according to claim 1, wherein:
   the sending the first marked charging-event record further comprises, by the network flow controller:
      determining a network message based at least in part on the first marked charging-event record, the network message comprising an indication that the first charging-event record could not be transmitted during the outage; and
      sending the network message via the communications interface; and
   the indication comprises at least one of:
      a header of the network message;
      a field in a structured-text body of the network message; or
      a part of multiple parts included in the network message.

7. The method according to claim 1, wherein the marking comprises at least:
   determining the first marked charging-event record comprising:
      at least some data from the first charging-event record; and
      an indication that the first charging-event record could not be transmitted during the outage; or
   storing at least a portion of the first charging-event record on a computer-readable medium in association with metadata indicating that the first charging-event record could not be transmitted during the outage.

8. The method according to claim 1, wherein the network flow controller comprises a Session Management Function (SMF) and the network-charging node comprises a Charging Function (CHF).

9. A network device, comprising:
a communications interface;
a buffer;
at least one processor; and
at least one non-transitory computer-readable medium storing instructions executable by the at least one processor to cause the at least one processor to perform operations comprising:
generating a first charging-event record associated with a network session;
detecting an outage at least partly by determining that no network-charging node is available to receive the first charging-event record via the communications interface;
in response to the detection of the outage, marking the first charging-event record to provide a first marked charging-event record;
storing the first marked charging-event record in the buffer;
receiving a request from a network terminal for a network service;
sending a reply message in response to the request, the reply message authorizing the network service;
generating a second marked charging-event record, the second marked charging-event record associated with the network service;
storing the second marked charging-event record in the buffer;
after the marking, detecting connectivity at least partly by determining that a network-charging node is available to receive the first marked charging-event record via the communications interface; and
in response to the detection of the connectivity, sending the first marked charging-event record to the network-charging node via the communications interface.

10. The network device according to claim 9, the operations further comprising, after detecting the connectivity, sending the second marked charging-event record to the network-charging node.

11. The network device according to claim 9, the operations further comprising, after detecting the outage and before detecting the connectivity:
generating one or more outage-associated marked charging-event records; and
storing the one or more outage-associated marked charging-event records in the buffer.

12. The network device according to claim 11, further comprising, by the network device, after detecting the connectivity, successively sending the outage-associated marked charging-event records to the network-charging node in compliance with a predetermined rate limit.

13. The network device according to claim 12, wherein:
the operations further comprise, after detecting the connectivity:
receiving a request from a network terminal for a network service;
generating a second charging-event record, the second charging-event record associated with the network service; and
sending the second charging-event record to the network-charging node;

the one or more outage-associated marked charging-event records comprise the first marked charging-event record and the second marked charging-event record;
the first marked charging-event record is sent to the network-charging node before the second charging-event record;
the second charging-event record is sent to the network-charging node before the second marked charging-event record; and
the operations for successively sending comprise operations for determining a rate of sending the outage-associated marked charging-event records so that a combination of transmissions complies with the predetermined rate limit, the combination of transmissions comprising:
the sending of the outage-associated marked charging-event records; and
the sending of the second charging-event record.

14. The network device according to claim 9, wherein:
the operations for sending the first marked charging-event record further comprise:
determining a network message based at least in part on the first marked charging-event record, the network message comprising an indication that the first charging-event record could not be transmitted during the outage; and
sending the network message via the communications interface; and
the indication comprises at least one of:
a header of the network message;
a field in a structured-text body of the network message; or
a part of multiple parts included in the network message.

15. The network device according to claim 9, wherein the network device comprises a Session Management Function (SMF) and the network-charging node comprises a Charging Function (CHF).

16. At least one tangible, non-transitory computer-readable medium storing instructions that, when executed by at least one processor, cause the at least one processor to perform operations comprising:
receiving, via a communications interface, a first charging-event record associated with a first network event;
determining a first charging-data record based at least in part on the first charging-event record;
sending the first charging-data record via the communications interface;
receiving, via the communications interface from an event-information source, a second charging-event record associated with a second network event;
determining that the second charging-event record is a marked charging-event record;
determining, at least partly in response, a second charging-data record based at least in part on the second charging-event record, the second charging-data record indicating that the second network event occurred during an outage of communication between the event-information source and the at least one processor; and
sending the second charging-data record via the communications interface.

17. The at least one tangible, non-transitory computer-readable medium according to claim 16, wherein:
the operations further comprise:
receiving the second charging-event record in a network message; and determining that the second charging-event record is a marked charging-event record at least partly by determining that the second charging-event record comprises an indication that the second charging-event record was captured during the outage; and the indication comprises at least one of:
- a header of the network message;
- a field in a structured-text body of the network message; or
- a part of multiple parts included in the network message.

18. The at least one tangible, non-transitory computer-readable medium according to claim 16, the operations comprising determining the second charging-data record including an information element (IE) indicating that the second network event occurred during the outage.

* * * * *